United States Patent [19]

Cha

[11] Patent Number: 5,532,814
[45] Date of Patent: Jul. 2, 1996

[54] HOLOGRAPHIC DIFFRACTION IMAGE VELOCIMETRY FOR THREE-DIMENSIONAL THREE-COMPONENT PARTICLE FIELDS OR SOLID OBJECTS

[76] Inventor: Soyoung S. Cha, 716 Grange Ct., Wheaton, Ill. 60187

[21] Appl. No.: 261,775

[22] Filed: Jun. 20, 1994

[51] Int. Cl.$^6$ .................................................. G01P 3/36
[52] U.S. Cl. .................... 356/28.5; 356/28; 356/337; 356/347
[58] Field of Search .................... 356/28, 28.5, 337, 356/347

[56] References Cited

U.S. PATENT DOCUMENTS

| | | | |
|---|---|---|---|
| 4,919,536 | 4/1990 | Komine | 356/28.5 |
| 5,333,044 | 7/1994 | Shaffer | 356/28 |

OTHER PUBLICATIONS

Malyak et al; Particle Displacement and Velocity Measurement Using Holography; Optical Engineering 1 Sep./Oct. 1984/vol. 23 No. 5 pp. 567–596.

Bryanston–Cross et al; Quantitative Analysis of Holographic Particle Data; Optics and Lasers in Engineering 18(1993) pp. 267–279.

Meng et al; Holographic Particle Velocimetry: A 3D Measurement Technique for Vortex Interactions, Coherent Structures and Turbulence Fluid Dynamics Research 8 (1991) 33–52.

*Primary Examiner*—Mark Hellner
*Attorney, Agent, or Firm*—Gifford, Krass, Groh, Sprinkle, Patmore, Anderson & Citkowski

[57] ABSTRACT

A Holographic Diffraction Image Velocimetry (HDIV) providing the three-dimensional (3-D), three-component (3-C) detection of velocity or displacement field. The HDIV technique and system are based on the independent reconstruction of time-sequence scenes captured on a single recording plate by dual-reference-beam, off-axis holography. The local areas of individual images, without any specific-particle focusing, are then scanned section by section with a solid state camera to obtain sufficient readout resolution. For velocity extraction, the image section that best correlates to the original image in a plane window is computationally searched from a transplaced volume window in the displaced field. Initially, in-plane motion is found statistically by applying two-dimensional cross-correlation (CC) to the middle section of the volume window, obtained with an intermediate depth of focus of the imaging system. Out-of-plane displacement is then located by cross-product, that is, by directly comparing the original image section with the sections along the optical axis at the in-plane displacement position, with a short depth of focus. The HDIV technique allows experimental freedom and post-control in data acquisition with reconstructed images. It can cover an extended region with high resolution and accuracy through utilization of high-density fine seed-particles. Its computation processing can further enhance performances without velocity sign ambiguity.

9 Claims, 7 Drawing Sheets

HOLOGRAPHIC DIFFRACTION IMAGE VELOCIMETRY FOR THREE-DIMENSIONAL THREE-COMPONENT PARTICLE FIELDS OR SOLID OBJECTS

FIELD OF THE INVENTION

This invention relates to methods for and systems of performing optically based gross-field velocimetry, and, more particularly, to such a technique based on three-dimensional, three-component holographic diffraction image capture and processing.

DESCRIPTION OF THE RELATED PRIOR ART

Gross-field measurements of velocity, displacement, and deformation are very important in all aspects of engineering and industrial activities. Practically speaking, most evaluation processes involving fluid flows or solid objects require special techniques for measuring these physical properties. Some examples of applications of gross-field measurements are: (1) investigations of fluid motions for fluid machinery, aircraft and automobile bodies, jet and internal-combustion engines, and heating/cooling devices; and (2) analysis of dynamic motion and deformation of machines and electronic components. Most gross-field techniques for measuring displacement or velocity, including the present invention, are based on detection of individual image element motions. While those techniques useful for fluid fields are also applicable to solid objects, it should be kept in mind that fluid fields are three-dimensional (3-D), whereas solid objects are two-dimensional (except for transparent media). In general, flow measurements are thus more complex than solid measurements.

There exist various prior art, non-intrusive, optical flow diagnostic techniques. Of continuous challenge and importance, however, is to instantaneously and accurately capture truly 3-D, three-component (3-C) velocity fields in time-dependent or turbulent flow for examining global as well as local flow structures. Such a method would provide very valuable information and would have numerous applications, not possible by using conventional point probes or two-dimensional two-component techniques. The salient nature of these flows is that they contain flow structures of a variety of scales and thus demand a 3-D 3-C technique-with a wide dynamic range, as well as good spatial resolution.

Laser Doppler Velocimetry, which is typical of conventional point probe techniques, has been frequently employed in flow measurements. It provides velocity information at a point in time. Deducing spatial transient flow structures from point probe measurements can be inaccurate and sometimes misleading owing to each spatial point being measured at different times, in addition to excessive measurement time, expended.

A typical conventional gross-field technique is particle image velocimetry (PIV), broadly inclusive of laser speckle velocimetry (LSV). These techniques have their origin in laser speckle photography (LSP) which was originally introduced in solid displacement measurements. The underlying principles of PIV and LSV are the same. These two techniques, as in LSP, are mostly associated with superimposed multiple, (usually double), exposure photographic recording of a displacing particle field and corresponding measurement of image element translation. At a lower limit of scattering site population, individual scattering site images are identifiable. As the population increases, the scattering site images start to overlap and form speckle patterns. This is the only difference distinguishing these two operation modes of PIV and LSV. PIV, together with point probes, can satisfy the need of many broad applications. However, it still provides only information for two-dimensional in-plane motion perpendicular to the observation direction (optical axis), and is not suitable for turbulent flow applications.

In an effort to capture 3-D flow fields, some investigators have employed techniques based-on in-line particle holography but these confront some intrinsic problems. First, since the signal object wave is produced through particle scattering of the reference wave, control of the intensity ratio of these two waves is very difficult during hologram recording. Consequently, relatively large particles, (mostly greater than 20 µm in diameter for practical experimental arrangements), need to be seeded in a flow to yield a sufficient signal level of the object wave. For this reason, the distance between the test field and recording material is very limited. The use of large seed particles not only significantly deteriorates depth resolution along the optical axis, but also increases speckle noise as compared with small particles for the same number density. Large particles also have difficulty in following flow streams, thus impairing flow measurement accuracy.

Second, all non-signal waves produced during image reconstruction emerge together in the propagation direction of the primary signal image: that is, the reconstruction wave, conjugate image, and speckle patterns recorded on the hologram due to cross-interference of particle diffraction are mixed together. These intermingled waves interfere with each other to contribute greatly to speckle noise in image acquisition. The speckle noise, which becomes especially prominent for large particles, in turn inhibits high particle density or thick illumination (test-volume) depth. Due to the requirement of low-density, large-particle seeding, the in-line techniques offer limited spatial resolution, dynamic range, and measurement accuracy, especially along the optical axis.

The usual practice for 3-D 3-C measurements has been to incorporate stereoscopic, dual holographic systems at two orthogonal directions, coupled with particle-by-particle tracking or auto-correlation of superimposed images for velocity extraction. The image element tracking of a large field with a numerous particle population is very demanding and laborious even for a low particle density. The registration of accurate positions is also difficult if each scene is captured on a separate hologram. When auto-correlation of superimposed images is utilized, the results can be inferior to those from cross-correlation of separate images with accurate position registration. The numerical implementation of auto-correlation and cross-correlation is very similar. However, the auto-correlation in conventional techniques raises some limitations. This procedure produces three major peaks: one primary peak from the self-correlation of the image and two secondary peaks from the correlation of displaced image-element pairs. The accurate detection of secondary peaks, that is, displacement, suffers from interference with the primary peak. It is also sensitive to other noise sources, including overlapping or nonmatching image elements in an interrogation window. For these reasons, the separation of image element pairs between two exposures generally needs to be sufficiently greater than their size at a lower limit, but less than half the window size at an upper limit. Thus, the auto-correlation processing to a certain degree limits performance. Another difficulty arises in velocity sign ambiguity due to the lack of time history in a superimposed image.

While the in-line techniques have some advantages in tolerance to optical system stability, less stringent requirement of laser coherence length, and cinematographic application, the aforementioned deficiencies make it difficult for broad deployment. The difficulties related to 3-D-decoding in stereoscopic observation, and poor spatial resolution and measurement accuracy resulting from low-density particle seeding, are especially major hindrances for broad application.

Stereoscopic cameras can also possibly be used to measure particle trajectories in three dimensions. Essentially a variation of the in-line holographic technique in principle except that it does not provide any depth information, this approach also confronts similar difficulties in flow measurements. In general, then, the current reported systems for 3-D 3-C velocimetry use these two approaches, both based on stereoscopic observation, which allows only small-region detection.

SUMMARY OF THE INVENTION

Holographic Diffraction Image Velocimetry (HDIV) of the present invention is a new optical measurement method that allows true instantaneous capture of three-dimensional (3-D), three-component (3-C) displacement or velocity fields.

HDIV is based on the capture and reconstruction of 3-D time-sequence images of a displacing volume particle or image element field on a single recording plate by using double exposure, double-reference-beam, off-axis holography. In HDIV, the local areas of an independently-reconstructed individual image, either in focus or diffracted, are scanned section by section with a solid state camera to obtain sufficient readout resolution. The local time-sequence images are then computationally processed to extract 3-C displacement information from a single observation direction. In the computational processing, the key to determining 3-C displacements is the volume-image sampling and interrogation-window-matching algorithm. In this processing, a small image section is selected from the initial volume image. A matching section is then found from a search volume in the displaced image. The search is accomplished through statistical cross-correlation (CC) of the images.

For implementation, two image sections that are captured with a reasonable depth of field are initially processed: one at a displacement estimate, that is, at the center of a transplaced search volume window (TW) of the displaced scene, and the other in an interrogation window of the initial scene. An improved in-plane displacement estimate is then calculated with coarse data sampling. The processing is repeated to find the accurate in-plane displacement with fine sampling for high spatial resolution and measurement accuracy by adopting the new estimate and substantially reduced variable size (VS) windows. Next, the image sections captured with a short depth of field through a differential aperture (DA) operation are analyzed. The out-of-plane component along the optical axis is then extracted through a cross product (CP) operation; the initial image section is directly compared with the displaced image sections scanned along the optical axis located at the accurate in-plane displacement.

The 3-C extraction of HDIV is practically comparable to two-dimensional CC of two image frames for each processing point. The computation of HDIV can thus be more efficient than that of conventional two-dimensional two-component techniques, utilizing VS windows with coarse-fine sampling. HDIV, providing a large effective aperture, can create 3-D details of a large field with high resolution and short depth of field. This replica of the original field allows post-control of image size, image resolution, and depth of field through adjustment of the magnification and aperture during sampling of the holographic-image. The most important feature of HDIV is the 3-D 3-C velocity extraction of a large field from a single observation direction without specific particle or image element focusing. Its implementing technique, which is based on the VS-TW-CC incorporated with the CP and DA operations, is novel.

Experiments, as well as theoretical investigations have verified that HDIV can allow sufficient measurement accuracy and spatial resolution in all three components for practical applications. For example, when 1 µm particles are utilized, the uncertainty of the out-of-plane component can be made less than 4.9 µm without elaborate image processing or computational schemes. The uncertainty of in-plane displacement is practically limited by finite pixel size.

HDIV offers the following additional merits as compared with prior art techniques: (1) experimental freedom in arbitrary beam illumination direction and detection region shape; (2) improved spatial resolution and measurement accuracy through utilization of high-density fine particles and large effective aperture; (3) measurement of an extended region; (4) computational efficiency based on VS-TW-CC as compared with particle tracking or auto-correlation in conventional techniques; and (5) speckle noise reduction as compared with in-line holographic techniques.

These and other objects and advantages of the invention will become more apparent from the following detailed description when taken in conjunction with the accompanying drawings.

DETAILED DESCRIPTION OF PREFERRED EMBODIMENTS

The Holographic Diffraction Image Velocimetry (HDIV) technique of the present invention works on the principle of measuring the three-dimensional (3-D) three-component (3-C) displacements of numerous time-sequence image elements reconstructed in space by a holographic technique. For dynamic phenomena, velocities can be found by dividing displacements by the time interval during the motion. Image elements are the finest structures (resolution) of an image in focus captured by an optical system. Fine seeded particles can scatter light to form image elements for fluids or transparent solids, while fine surface irregularities, natural or coated, form image elements for opaque surfaces. Consequently, it should be emphasized that the HDIV is equally applicable to fluid flow and solid object evaluation. This technique, covering 3-D mapping, can offer a measurement capability of arbitrarily shaped surfaces in the case of two-dimensional evaluation.

Figure 1:
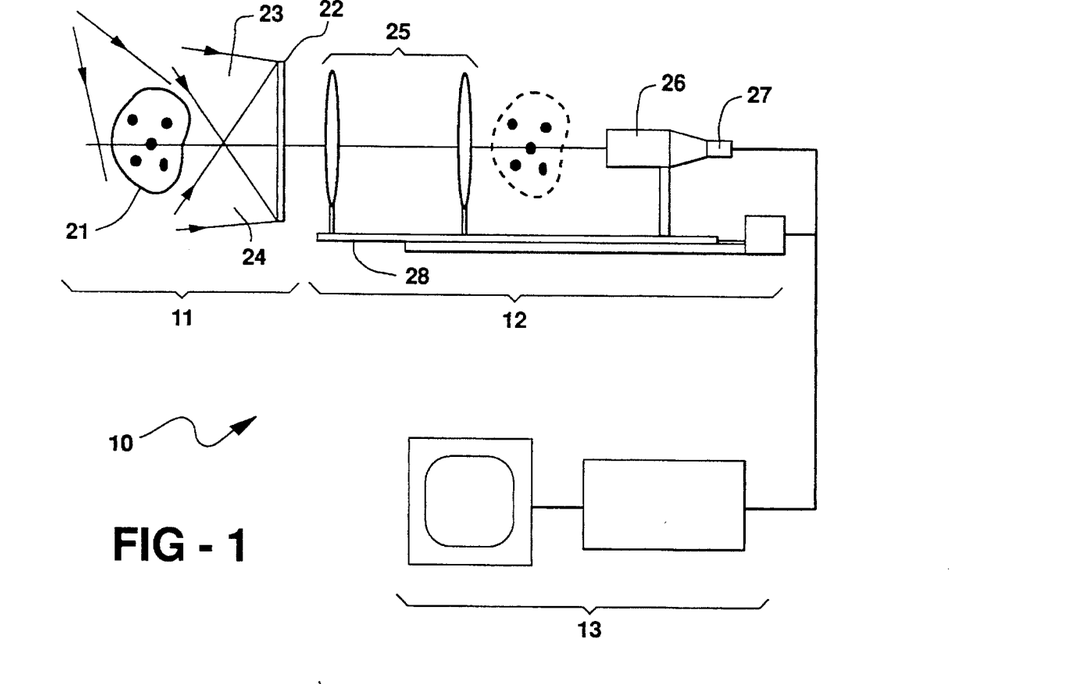
FIG. 1 is a schematic representation of a system employing the Holographic Diffraction Image Velocimetry technique (HDIV) of the present invention.

An optical system 10 for performing HDIV is shown in FIG. 1. The system 10 comprises a double-reference-beam off-axis holographic recording and reconstruction system 11, image acquisition system 12, and computer control and processing system 13.

In the HDIV techniques, individual 3-D scenes of a displacing particle field 21 at two distinct moments are independently recorded on a holographic plate 22 and reconstructed with separate beams 23 and 24. The reconstructed virtual images are then: re-imaged by a large-aperture image relay optics (i.e. telecentric imaging) system 25; magnified by a magnifying optics (i.e. microscope objective) system 26; and digitized by a solid-state detector array (i.e., CCD array) 27. The magnification can provide high readout resolution by the detector. All these components of the image acquisition system are mounted on a computer-controlled x-y-z translation stage 28 to scan three-dimensional images.

Figure 2:
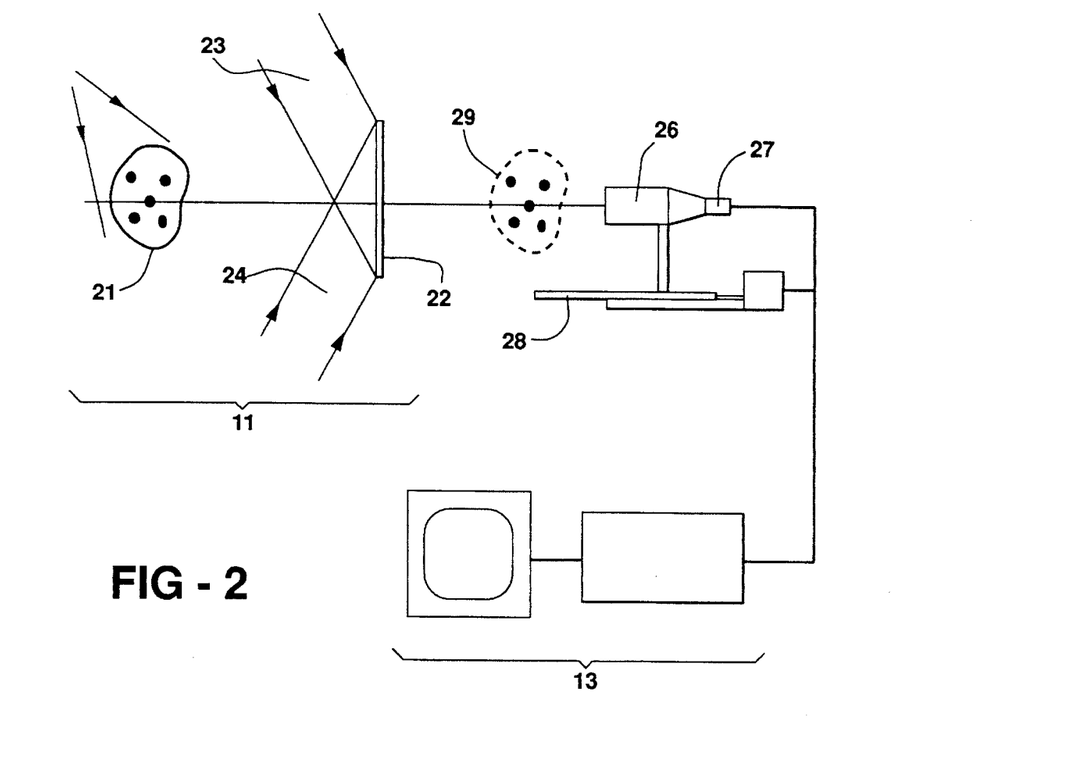
FIG. 2 is an alternate embodiment of an HDIV system which permits direct interrogation of holographic real images without image relay optics.

FIG. 2 shows an alternate embodiment of the system 10 in which reconstructed real images can be directly scanned without an image relay optics system. It is well known that real images 29 can be formed by rotating a holographic plate 22 180 degrees and using appropriate reference and reconstruction beams 23 and 24.

Figure 3:
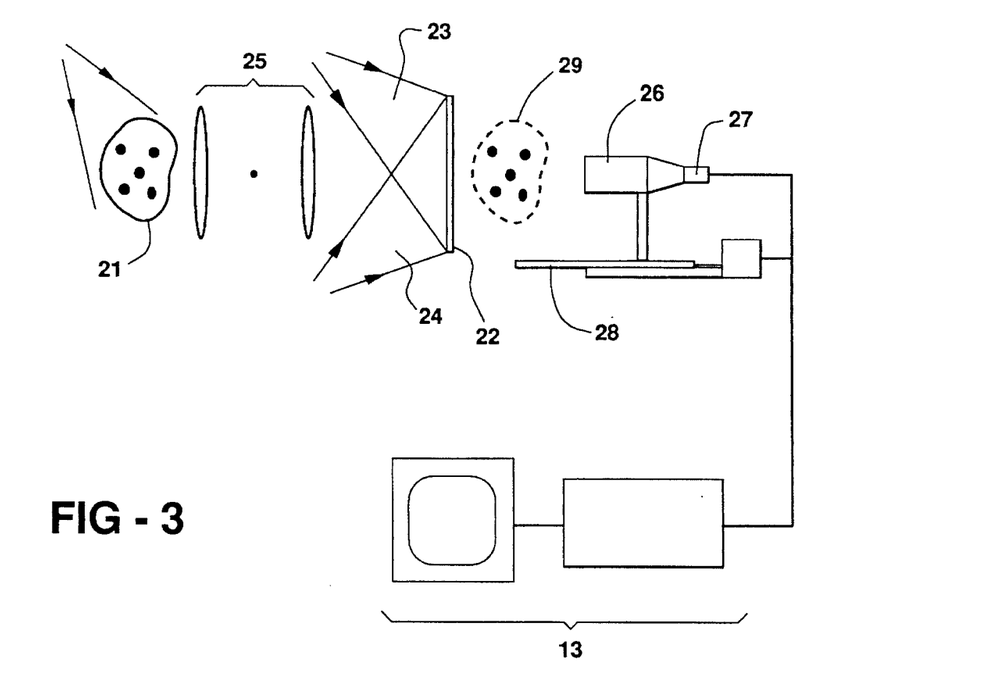
FIG. 3 is another embodiment for an HDIV system for recording the images formed by image relay optics.

FIG. 3 shows yet another embodiment of the system 10. Here, real images are first formed by an image relay optics system 25 and recorded on a holographic plate 22. The reconstructed images 29 are then scanned in a manner similar to that described for the embodiments of FIGS. 1 and 2.

The HDIV system provides a large effective angular aperture θ that can be determined by the smallest value among the scattering angle of particles, subtended angle of the holographic plate, and angular aperture of other optical components. It can be shown that the resolution d and half depth of field Δ1, respectively, are as follows in terms of the object space dimension:

$$d \approx \frac{\lambda}{\theta} \quad (1)$$

$$\Delta l \approx \frac{d^2}{\lambda} \quad (2)$$

where $\lambda$ denotes laser wavelength. The object element size is defined as the image-element size divided by the image magnification. If so, d represents the approximate object-element size for a particle while $\Delta 1$ (sometimes called a far field) corresponds to the decorrelation distance of its diffraction image at an out-of-focus position. The object-element size d can be found more precisely through convolution of an object with the point spread function of an optical setup.

In in-line holography, the large particles employed produce a small forward-diffraction angle of $\theta = d_p/\lambda$ where $d_p$ is particle diameter. This technique actually forms image elements close to $d_p$ in size by Eq. (1). Thus, there is a restricting factor in forming fine image elements which also produced a short depth of field for accurate out-of-plane motion (z-component) detection along the optical axis with in-line holography techniques. Since all angular apertures of the system components can be made comparable to that of the large holographic plate, the HDIV technique, in contrast, can produce a short depth of field $\Delta 1$ and a small object-element size d for sufficiently small particles. For example, with $\lambda = 0.5$ μm and $\theta = 0.2$, $d = 2.5$ μm and $\Delta 1 = 12.5$ μm, respectively. In the HDIV system, the control of d and $\Delta 1$ is possible by adjusting the aperture size.

The coordinate origin is the image point Where the velocity is to be found. Computational velocity extraction in HDIV is, in principle, based on the two-dimensional variable-size (VS), transplaced-window (TW), cross-correlation (CC), as expressed by Eq. (3), together with cross-product (CP) and differential aperture (DA) operations.

$$C(u,v\backslash w) = \iint I_{w_1}(x-u, y-v, 0) I_{w_2}(x,y,w) dx dy$$

$$I_{w_1}(x,y,0) = I_1(x,y,0) W_1(x,y)$$

$$I_{w_2}(x,y,z) = I_2(x,y,z) W_2(x-\Delta x_i, y-\Delta y_i, z-\Delta z_i) \quad (3)$$

where C, $I_1$, $W_1$, $I_2$ and $W_2$ are: correlation value, initial particle-field image; interrogation plane window centered at the origin; displaced particle-field image; and transplaced search volume window (TW) centered at a displacement estimate $(\Delta x_i, \Delta y_i, \Delta z_i)$, respectively. $W_2$ is made large enough to contain the image section that matches the initial window image $I_{w_1}$. Basically, Eq. (3) represents the correlation of the initial plane image in a smaller window with images at many sections in a larger, transplaced search volume. The position for the maximum correlation corresponds to the displacement $(\Delta x_a, \Delta y_a, \Delta z_a)$ of the image elements in $W_1$. Since near-field diffraction images are analyzed, HDIV does not require focusing of specific particles or image elements as long as their density is sufficient.

Direct operation of Eq. (3) is computation-intensive and, thus, the following efficient correlation peak search is used. First, two image sections obtained, with a reasonably small imaging aperture are processed: that is, $I_{w_1}(x,y,0)$ and $I_{w_2}(x,y,\Delta z_i)$ are sampled by using a displacement for the TW with appropriate window sizes to ensure a clear peak in CC. In practice, the displacement estimate is available a priori, i.e., neighboring values. A new in-plane (xy-component perpendicular to the optical axis) displacement estimate is then detected at the peak of the TW-CC, that is, $C(u,v|\Delta z_i)$, with coarse data points (i.e., every other pixel) in the windows. The calculation is then repeated with properly reduced windows $W_1$ and $W_2$ but with all data points and the new estimate. The repeated operation, using reduced VS windows, can provide an accurate search of $(\Delta x_a, \Delta y_a)$ with good spatial resolution without much computation. The properly narrowed-down aperture, providing a sufficient depth of field, can allow an accurate in-plane displacement search with only two image sections. In the VS-TW-CC operation, the initial displacement estimate, allowing use of reasonably small windows, together with the coarse data processing, can greatly enhance computation speed and enable the use of personal computers in the system of the present invention.

Second, after detecting in-plane motion, the system samples $I_{w_1}$ and $I_{w_2}$ data obtained with a large (possibly maximum) imaging aperture and small windows of the same cross-sectional area; however, this time, $I_{w_2}$ is scanned only along the optical axis locked at the accurate in-plane displacement of $(\Delta x_a, \Delta y_a)$. $\Delta z_z$ is then found at the peak of $(\Delta x_a, \Delta y_a|w)$ which is the simple CP of the images. The aperture increase, that is, the DA operation, allows accurate measurement of the z-component, providing image sections with a short depth of field.

The computational extraction of the HDIV technique (VS-TW-CC), utilizing separate images with nonoverlapping windows for each exposure, produces a single peak at a displacement position without nonmatching image-elements. Hence, it is less susceptible to noise and allows displacement detection which approaches a fraction of the image-element size at the lower limit and extends beyond the interrogation window size at the upper limit, respectively. In practice, $(\Delta x_a, \Delta y_a)$ cannot be measured exactly. Hence, the CP operation needs to be performed for additional neighboring points around $(\Delta x_a, \Delta y_a)$. The VS-TW-CC technique enables the use of relatively small processing windows by locating the search volume beyond the interrogation window even with crude knowledge of displacements. The technique, VS-TW-CC, together with the incorporated coarse-fine sampling strategy and DA operation, can thus greatly enhance computation efficiency while providing high spatial resolution and measurement accuracy. The processing time for CP is negligible as compared with the two-dimensional CC. Consequently, the computation time of 3-C extraction by HDIV can actually be shorter than two-component extraction by conventional Particle Image Velocimetry (PIV) based on auto-correlation for each processing point.

EXPERIMENTAL

Figure 4:
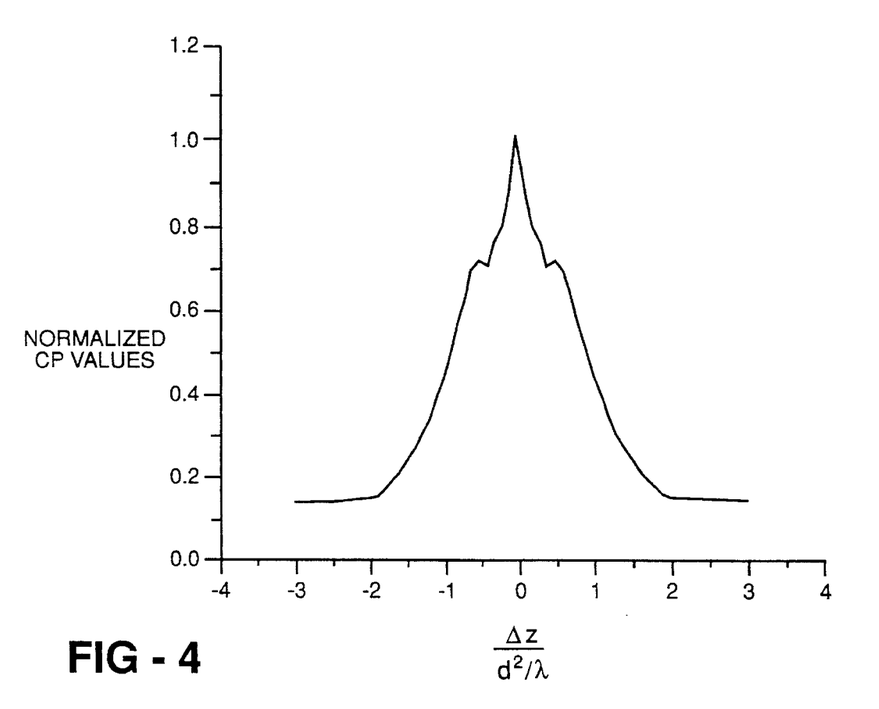
FIG. 4 shows computer-simulated cross-product (CP) values for a single particle and $d/\lambda=10$ with the interrogation window particle image in focus (the image at $\Delta z=0$ corresponds to the in-focus position)
Figure 5:
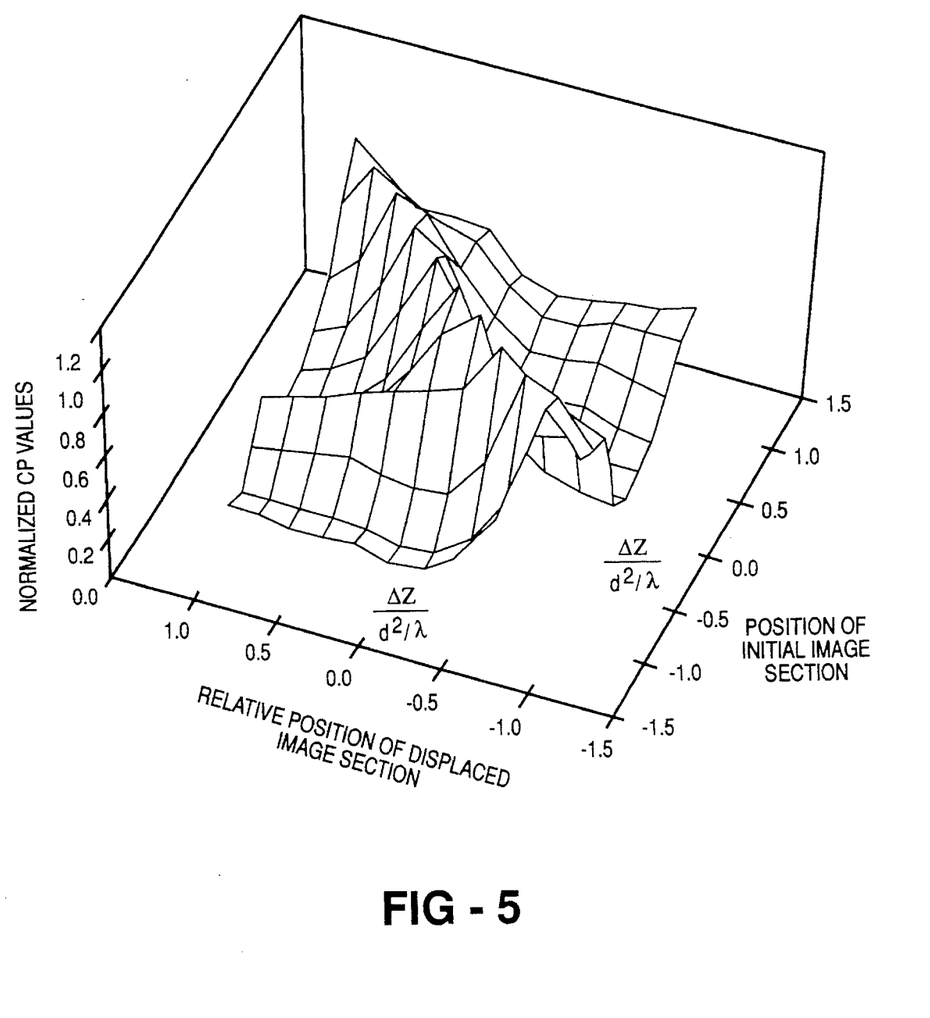
FIG. 5 shows computer-simulated CP values for 8 particles randomly dispersed in the transplaced search volume window $W_2$ and $d/\lambda=10$ (the images at $\Delta z=0$ correspond to the mid section of $W_2$ and its initial counterpart)

The key feature of HDIV is z-component detection. Initially, a computer simulation of experiments was conducted by assuming circularly uniform image, elements formed by particles. Forward diffraction ranging from a very near field to the Fresnel zone was calculated by employing the transfer function $H=\exp\{j2\pi z(1-\lambda^2 f_x^2-\lambda^2 f_y^2)^{1/2}/\lambda\}$ where $f_x$ and $f_y$ are spatial frequencies of a complex amplitude. Typical correlation results with a single particle and 8 particles are shown in FIGS. 4 and 5, respectively, for $d/\lambda=10$. As seen in FIG. 4, the CP drops about 30% at a half far field with the particle in focus in the interrogation window $W_1$, allowing accurate z-component prediction. When the $W_1$ particle image defocused, the displacement prediction becomes inaccurate, exhibiting two symmetric peaks. However, this problem is easily corrected by increasing the particle population to 3–5 as demonstrated in FIG. 5. As seen, the CP reaches maximum values along the diagonal that represents the matching image section pairs.

Figure 6:
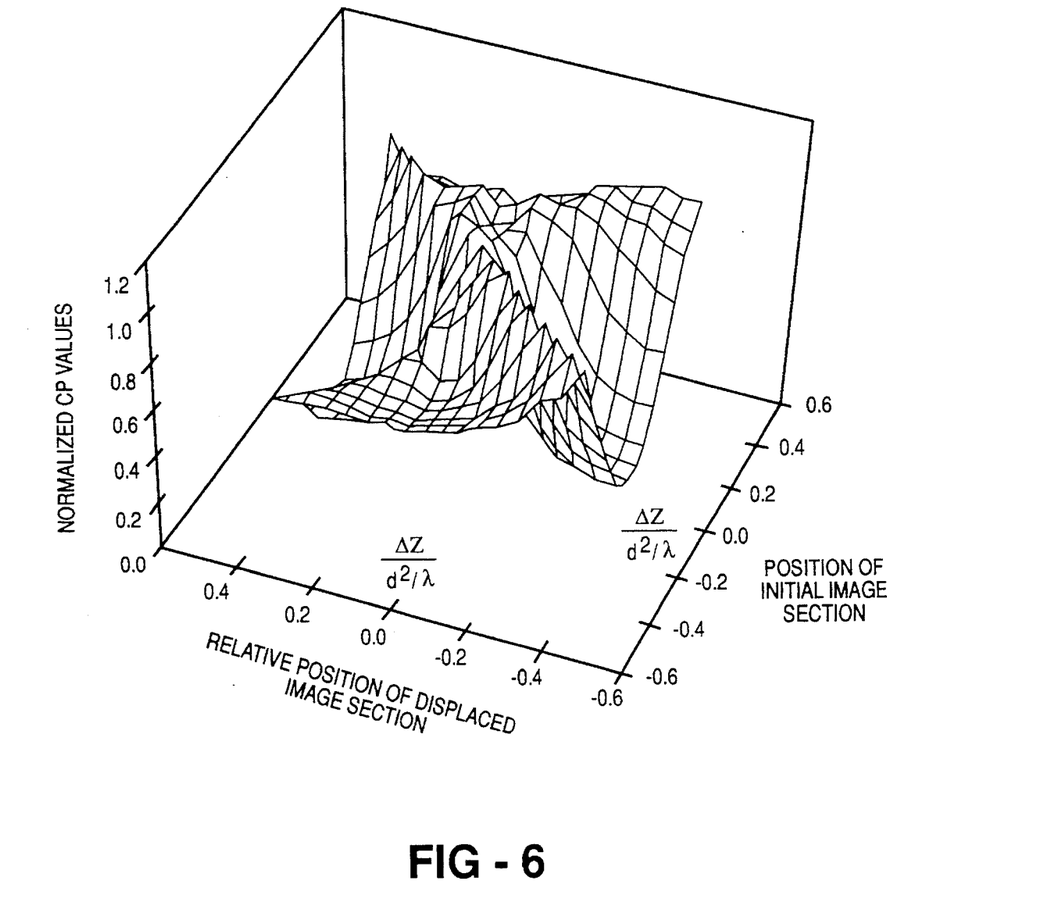
FIG. 6 shows measured CP values for a single particle and $d/\lambda=15.8$ at a side scattering mode (the images at $\Delta z=0$ correspond to the mid section of $W_2$ and its initial counterpart)
Figure 7:
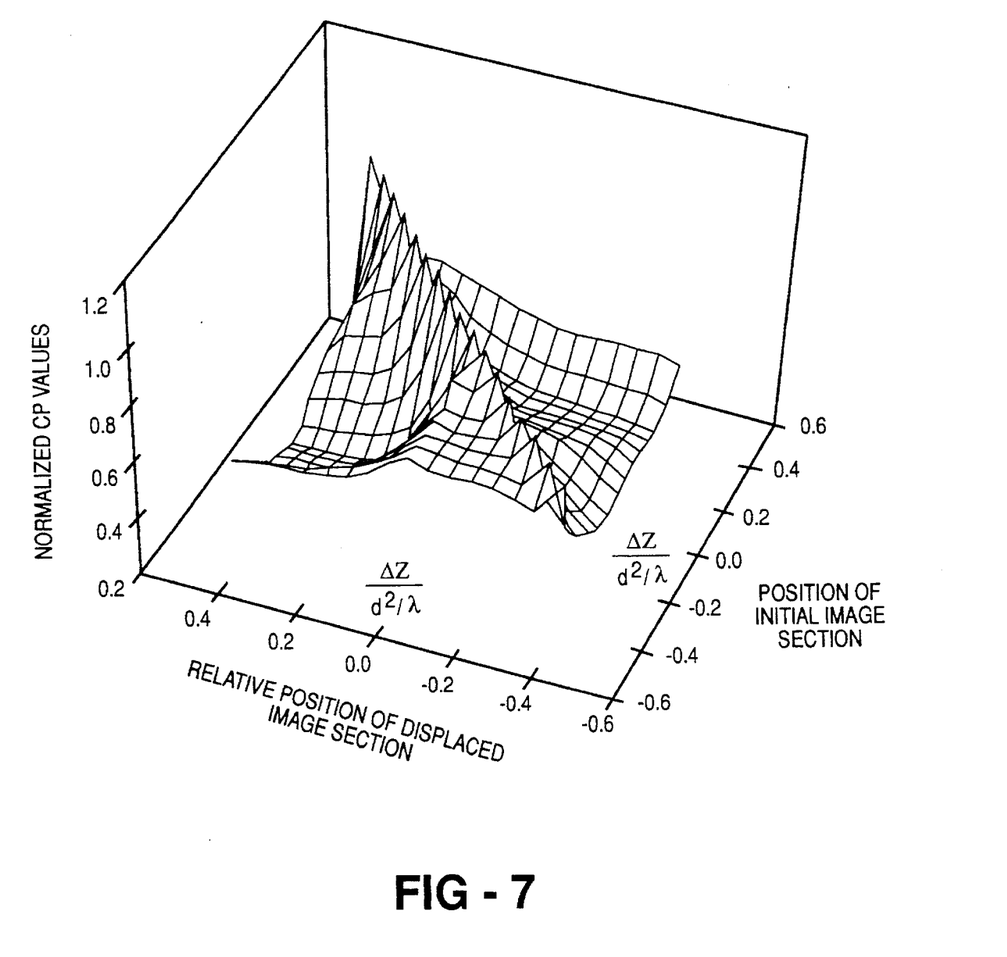
FIG. 7 shows measured CP values for 4 particles and $d/\lambda=15.8$ at a side scattering mode.

To further verify the concept and practical applicability of the present invention, a 3-D field with 8 μm particles dispersed in a solidified transparent plastic was investigated for side scattering. FIGS. 6 and 7 show typical CP results of a single particle and four particles in $W_2$, respectively, with a HeNe laser of $\lambda=0.633$ μm. The object element size in side scattering was slightly increased to about 10 μm due to finite $\theta$. Contrary to the computer simulation shown in FIG. 4, the CP clearly exhibits peaks along the diagonal, even with a single particle, since out-of-focus particle images are not symmetric with respect to the image section in focus. The cross sections of the CP plot become more similar to each other when particle population is increased in the window, as manifested in FIG. 7. These can greatly enhance the applicability and accuracy of the HDIV in z-component detection. A conservative assessment based on the investigation indicates that the z-direction image decorrelation distance can be less than $0.2\ d^2/\lambda$.

Figure 8:
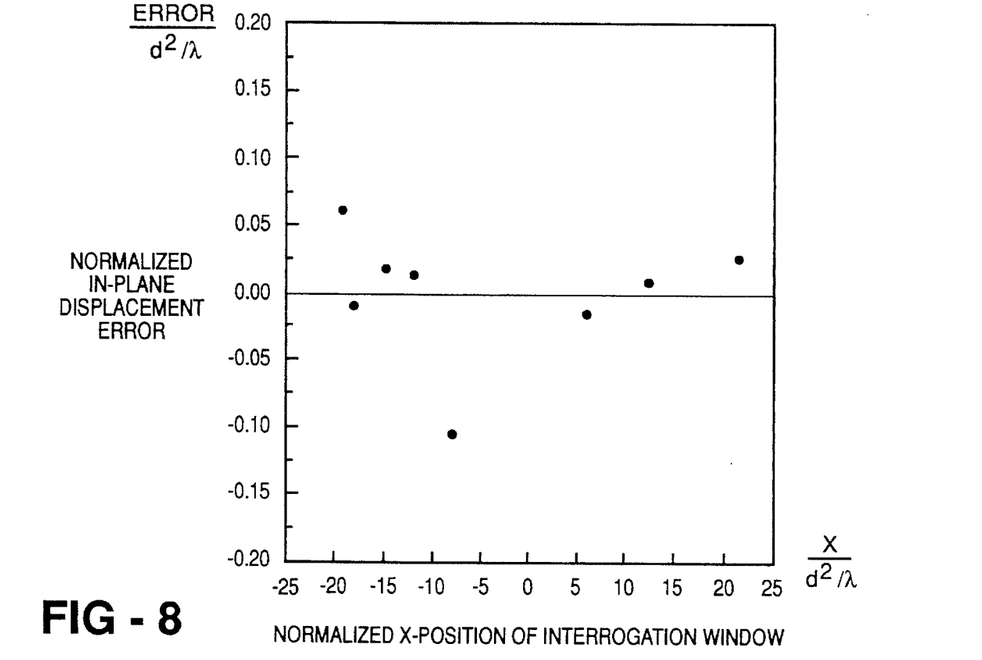
FIG. 8 shows xy-component measurement uncertainty of a particle field around a rotation axis: $d/\lambda=18.7$ at a side scattering mode.
Figure 9:
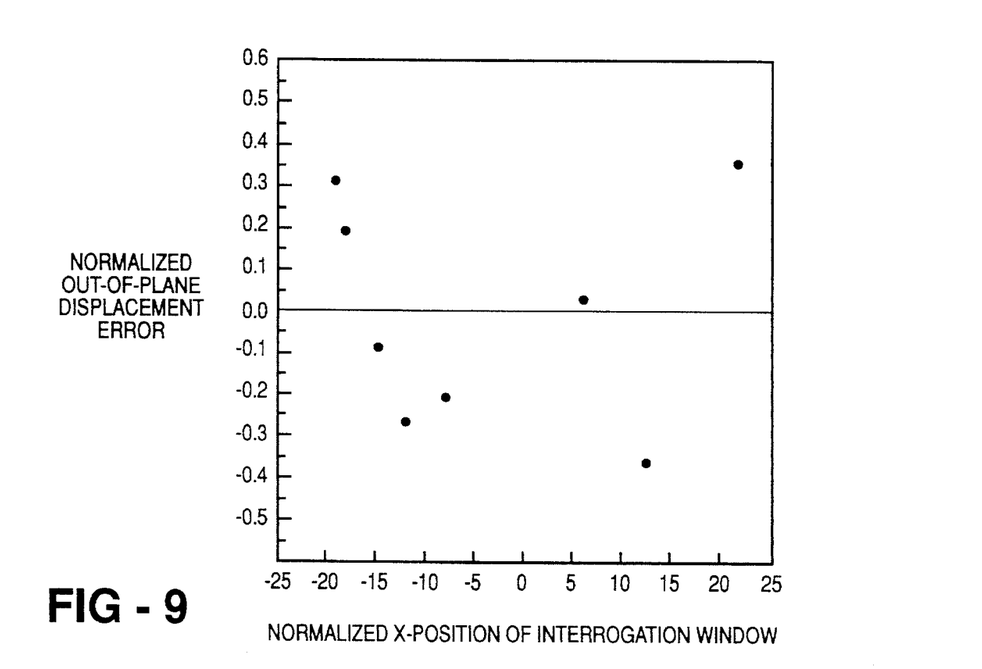
FIG. 9 shows z-component measurement uncertainty of a particle field.

For those experiments involving pure translation motion or in-plane rotation, an error of much less than one pixel in the image plane was obtained for the xy-component. Practical turbulent measurements involve velocity gradients in a search volume. To test the HDIV ability for detecting small scale vorticity, the aforementioned particle field with a density of about $3.7\times 10^4$ ea./mm$^3$ was rotated around the vertical axis by 0.03 rad. The two scenes, that is, before and after the motion, were holographically recorded with an Ar-ion laser of $\lambda=0.515$ μm. The displacement was then extracted near the rotation axis. The estimated measurement inaccuracy along a straight line in the illumination direction perpendicular to the optical axis is shown in FIGS. 8 and 9. This test was rather harsh due to appreciable displacement nonuniformity existing in the window $W_2$. The motion experiment with fixed particles provided accurate uncertainty assessment not readily available by other means. As seen in FIGS. 8 and 9, the xy-component and z-component uncertainty was less than $0.045\ d^2/\lambda$ and $0.25\ d^2/\lambda$, respectively.

Figure 10:
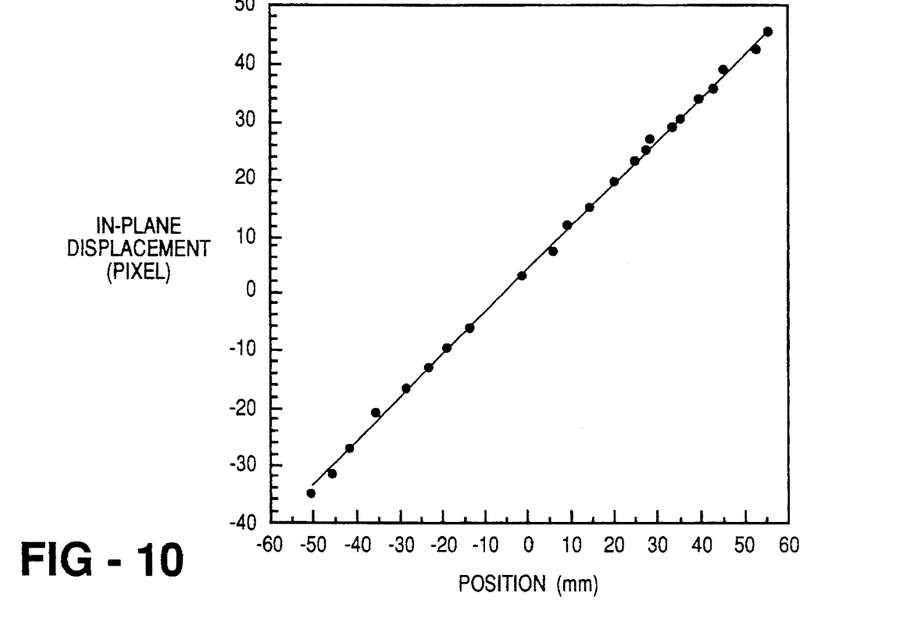
FIG. 10 shows measured in-plane components in the image space, plotted against positions in the object space for a rotated plane particle field (the solid line represents accurate values)
Figure 11:
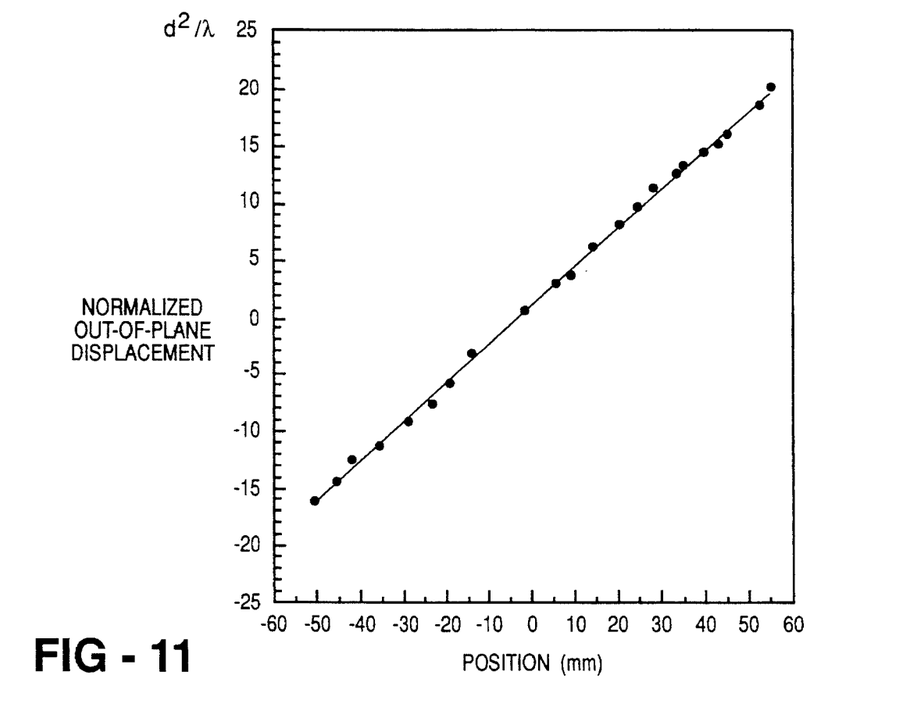
FIG. 11 shows measured z-component in the object space.

HDIV is also applicable to 3-C displacement detection of two-dimensional particle field sections or opaque surfaces of arbitrary shape. FIGS. 10 and 11 show experimental measurements of a large plane field rotated around the y-axis perpendicular to the optical axis. A glass plate was coated with 8 μm particles of the same size and illuminated almost parallel to the plane for side scattering. The optical setup produced the object-element size of 10 μm as before. In these figures, the solid line represents accurate values. The in-plane detection error, being less than 0.35 pixels in the image space, was practically limited by a finite pixel size. The z-component uncertainty was similar to the previous value, being about $0.25\ d^2/\lambda$.

The experimental results were good despite the error contributions by limited image section sampling, no interpolation in correlation peak search, no elaborate image processing for noise reduction, and translation stage uncertainty in addition to appreciable nonuniform particle motions in a window for the rotating fields. Based on the experiments, a z-component uncertainty below $0.25\ d^2/\lambda$ can be achieved. For fine particles of 1 μm in size, the object element size is about 3.5 μm with $\theta=0.2$ and $\lambda=0.5$ μm. Hence, this can be interpreted as z-component accuracy better than 4.9 μm for the above conditions.

The above described experiments show that the HDIV technique of the present invention can be used for a variety of applications, gives accurate results, and requires minimal computer hardware and processing time. Thus, it overcomes the disadvantages of the prior art noted previously. Of course, one skilled in the art, having had the benefit of the teachings of the present invention, might make design variations to the embodiments and exemplifications actually depicted without departing from the scope of the inventive concept set forth herein. Thus, it is the claims, rather than the depicted embodiments and exemplifications, as well as all reasonable equivalents thereof, which define the scope of the invention.

I claim:

1. A system for performing three-dimensional, three-component displacement or velocity field detection from a single observation direction defining an optical axis, said system comprising:

a double-reference beam, off-axis holographic recording system disposed on said optical axis and including means for independently recording two three-dimensional images of a displacing particle or image-element field corresponding to two distinct moments on a single holographic plate, and means for reconstructing said images with separate beams;

an image acquisition system disposed on said optical axis and including a large aperture image relay optics system to re-image said reconstructed images, a magnifying optical element for magnifying said re-imaged images, and a solid state detector for receiving said magnified images and digitizing them; and a control and processing means for receiving said digitized images and processing them according to an algorithm:

$$C(u,v\backslash w) = \iint I_{w_1}(x-u, y-v, 0) I_{w_2}(x,y,w) dx dy$$

$$I_{w_1}(x,y,0) = I_1(x,y,0) W_1(x,y)$$

$$I_{w_2}(x,y,z) = I_2(x,y,z) W_2(x-\Delta x_i, y-\Delta y_i, z-\Delta z_i)$$

where C equals correlation value, $I_1$ equals initial particle-field image, $W_1$ equals interrogation plane window centered at an origin, $I_2$ equals displaced particle-field image, and $W_2$ equals transplaced search volume window centered at a displacement estimate $(\Delta x_i, \Delta y_i, \Delta z_i)$.

2. The system of claim 1 further comprising a computer controlled X-Y-Z translation stage for mounting said image acquisition system on said optical axis such that said acquisition system can scan three-dimensional images.

3. A system for performing three-dimensional, three-component displacement or velocity field detection from a single observation direction defining an optical axis, said system comprising:

a double-reference beam, off-axis holographic recording system disposed on said optical axis and including means for independently recording two three-dimensional images of a displacing particle or image-element field corresponding to two distinct moments on a single holographic plate, and means for reconstructing said images with separate beams;

a magnifying optical element and solid state detector disposed on said axis for magnifying, receiving, and digitizing said reconstructed images; and a control and processing means for receiving said digitized images and processing them according to an algorithm:

$$C(u,v\backslash w) = \iint I_{w_1}(x-u, y-v, 0) I_{w_2}(x,y,w) dx dy$$

$$I_{w_1}(x,y,0) = I_1(x,y,0) W_1(x,y)$$

$$I_{w_2}(x,y,z) = I_2(x,y,z) W_2(x-\Delta x_i, y-\Delta y_i, z-\Delta z_i)$$

where C equals correlation value, $I_1$ equals initial particle-field image, $W_1$ equals interrogation plane window centered at an origin, $I_2$ equals displaced particle-field image, and $W_2$ equals transplaced search volume window centered at a displacement estimate $(\Delta x_i, \Delta y_i, \Delta z_i)$.

4. The system of claim 3 wherein said real images are reconstructed by rotating said holographic plate 180 and using appropriate reference and reconstruction beams, and are directly scanned.

5. The system of claim 3 further comprising a large aperture image relay optics system disposed on said optical axis to form said two three-dimensional images and record said images on a holographic plate.

6. The system of claim 3 further comprising a large aperture image relay optics system to re-image said reconstructed images.

7. A method of three-dimensional, three-component holographic diffraction image velocimetry comprising the steps of:

independently recording two three-dimensional, time displaced images of a displacing particle or image-element field on a single holographic plate by using double exposure, double reference beam, off-axis holography;

independently reconstructing each of said images with a separate reconstructing beam;

scanning the local areas of the reconstructed images section by section with a solid state camera without focussing on a specific particle or image element to obtain sufficient read out resolution and to process said image sections according to the algorithm:

$$C(u,v|w) = \iint [I_w]I_{w1}(x-u,y-v,0)\ [I_w]I_{w2}(x,y,w)dxdy$$

$$[I_w]I_{w1}(x,y,0) = I_1(x,y,0)W_1(x,y)$$

$$[I_w]I_{w2}(x,y,z) = I_2(x,y,z)W_2(x-\Delta x_i, y-\Delta y_i, z-\Delta z_i)$$

selecting two of the image sections produced by said scanning step, said two image sections having a reasonable depth of field, one, an initial field image section $[I_w]I_{w1}(x,y,0)$, of said two selected image sections falling within an interrogation plane window $(W_1)$ centered at a coordinate origin coinciding with an image point where displacement or velocity is to be found, the other, a displaced field image section $[I_w]I_{w2}(x,y,\Delta z_i)$ of said selected images being centered in a transplaced search volume window (TW) centered at a point displaced in three spatial directions from $W_1$ by a displacement estimated at $(\Delta x_i, \Delta y_i, \Delta z_i)$, respectively, the sizes of $W_1$ and $W_2$ being selected to ensure a clear peak when cross correlated;

calculating cross correlation values of said two selected image sections according to the algorithm to drive a new, in-plane displacement estimate at the peak of xy correlation perpendicular to an optical axis $C(u,v|z_i)$ using relatively few data points in the windows $W_1$ and $W_2$;

reducing the sizes of $W_1$ and $W_2$ and repeating the calculation step using all available data points and the newly derived displacement estimate to derive an in-plane component of displacement $(\Delta x_a, \Delta y_a)$ of said particle or image element field;

selecting a new initial image section $[I_w, (z,y,0)I_{w1}(x,y,0)$ and a plurality of new displaced field image sections $[I_w]I_{w2}(x,y,z)$ with a TW centered at a point $(\Delta x_a, \Delta y_a, \Delta z_i)$, said new field image sections having a short depth of field and falling within respective window sections $W_1$ and $W_2$ which are approximately equal in size; and extracting an out-of-plane component of displacement ($\Delta z_a$) by deriving cross product (CP) values for points between $I_{w1}(x,y,0)$ and $I_{w2}(x,y,z)$ along the optical axis at $(\Delta x_a, \Delta y_a)$ and also for neighboring points of $(\Delta x_a, \Delta y_a)$.

8. The method of claim 7 wherein said two three-dimensional images are time displaced by $\Delta t$ and comprising the further steps of:

calculating an in-plane component of velocity according to $(\Delta x_a, \Delta y_a)/\Delta t$; and calculating an out-of-plane component of velocity according to $\Delta z_a/\Delta t$.

9. A method of in-plane displacement or velocity extraction from two time-displaced image sections of a displacing particle or image-element field, based on the two-dimensional variable-size (VS) transplaced-window (TW) cross-correlation (CC) comprising the steps of:

selecting two image sections, said two image sections having a reasonable depth of field, one, an initial field image section $I_{w1}(x,y,0)$, of said two selected image sections falling within an interrogation plane window ($W_1$) centered at a coordinate origin coinciding with an image point where displacement or velocity is to be found, the other, a displaced field image section $I_{w2}(x,y,\Delta z_i)$ of said selected images being centered in a transplaced search volume window (TW) centered at a point displaced in three spatial directions from $W_1$ by a displacement estimated at $(\Delta x_i, \Delta x_i, \Delta z_i)$, respectively, the sizes of $W_1$ and $W_2$ being selected to ensure a clear peak when cross correlated;

calculating cross correlation values of said two selected image sections according to the algorithm;

$$C(u,v|\Delta z_i) = \iint I_{w1}(x-u,y-v,0) I_{w2}(x,y,\Delta z_i) dx dy$$

$$I_{w1}(x,y,0) = I_1(x,y,0) W_1(x,y)$$

$$I_{w2}(x,y,z) = I_2(x,y,z) W_2(x-\Delta x_i, y-\Delta y_i, z-\Delta z_i)$$

to drive a new, in-plane displacement estimate at the peak of an xy correlation perpendicular to an optical axis $C(u,v|\Delta z_i)$ using relatively few data points in the windows $W_1$ and $W_2$;

reducing the sizes of $W_1$ and $W_2$ and repeating the calculation step using all available data points and the newly derived displacement estimate to derive an in-plane component of displacement $(\Delta x_a, \Delta y_a)$ of said particle or image element field.

* * * * *